United States Patent
Segiet et al.

(10) Patent No.: US 8,910,674 B2
(45) Date of Patent: Dec. 16, 2014

(54) BEVERAGE DISPENSE VALVE CONTROLLED BY WIRELESS TECHNOLOGY

(75) Inventors: William W. Segiet, Bethel, CT (US); Alex L. Gray, Valhalla, NY (US); Fernando A. Ubidia, Ludlow, MA (US); Aaron M. Stein, Ludlow, MA (US); John F. Lewis, Ludlow, MA (US)

(73) Assignee: PepsiCo, Inc., Purchase, NY (US)

( * ) Notice: Subject to any disclaimer, the term of this patent is extended or adjusted under 35 U.S.C. 154(b) by 988 days.

(21) Appl. No.: 12/704,217

(22) Filed: Feb. 11, 2010

(65) Prior Publication Data

US 2010/0200110 A1 Aug. 12, 2010

Related U.S. Application Data

(60) Provisional application No. 61/151,770, filed on Feb. 11, 2009.

(51) Int. Cl.
*B65B 1/30* (2006.01)
*G07F 13/10* (2006.01)
*G07F 13/02* (2006.01)
*B67D 3/00* (2006.01)
*G06Q 20/32* (2012.01)
*G07F 13/06* (2006.01)
*B67D 1/08* (2006.01)

(52) U.S. Cl.
CPC ...... *B67D 1/0888* (2013.01); *B67D 2001/0811* (2013.01); *G07F 13/10* (2013.01); *G07F 13/025* (2013.01); *H04Q 2213/13095* (2013.01); *B67D 3/0074* (2013.01); *G06Q 20/3278* (2013.01); *B67D 3/0077* (2013.01); *G07F 13/065* (2013.01)
USPC ............. 141/198; 141/95; 141/192; 141/360; 340/572.1

(58) Field of Classification Search
USPC ................. 141/83, 94, 98, 192, 198, 95, 360; 235/381–382.5; 340/572.1
See application file for complete search history.

(56) References Cited

U.S. PATENT DOCUMENTS 5,158,793 A * 10/1992 Helbling ........................ 426/231
5,491,333 A * 2/1996 Skell et al. ................. 250/222.1

(Continued)

FOREIGN PATENT DOCUMENTS

| CA | 2414870 | 6/2004 |
| DE | 202004002163 | 4/2004 |
| DE | 202006000532 | 3/2006 |

OTHER PUBLICATIONS

International Search Report in corresponding PCT Application, International Application No. PCT/US2010/023825, mailed Oct. 20, 2010.

(Continued)

*Primary Examiner* — Timothy L Maust
(74) *Attorney, Agent, or Firm* — Banner & Witcoff, Ltd.

(57) ABSTRACT

Methods and systems directed to dispensing fluids, such as beverages, using wireless technology are provided. Aspects relate to a container, such as a beverage cup, having a wireless transceiver configured to transmit and/or receive wireless signals to a second wireless transceiver associated with a dispenser. The wireless transceiver may be configured to transmit electronic signals indicative that the container is validated to receive a beverage and whether it is properly located to receive the beverage from a valve of the dispenser. Further aspects of the invention relate to a beverage dispensing system having a wireless transceiver. In one embodiment, the dispenser is configured to receive a return signal from a container indicative that the container is validated to receive a beverage and whether the container is properly located to receive a beverage from a valve of the dispenser.

32 Claims, 5 Drawing Sheets

(56) References Cited

U.S. PATENT DOCUMENTS

| | | | |
|---|---|---|---|
| 5,566,732 A * | 10/1996 | Nelson | 141/94 |
| 5,603,430 A | 2/1997 | Loehrke | |
| 6,169,938 B1 * | 1/2001 | Hartsell, Jr. | 700/302 |
| 6,394,153 B2 | 5/2002 | Skell et al. | |
| 6,546,795 B1 | 4/2003 | Dietz | |
| 6,564,999 B1 * | 5/2003 | Saveliev et al. | 235/383 |
| 6,696,954 B2 | 2/2004 | Chung | |
| 6,705,356 B2 * | 3/2004 | Barton et al. | 141/2 |
| 6,759,072 B1 * | 7/2004 | Gutwein et al. | 426/433 |
| 6,968,876 B2 * | 11/2005 | Yacko et al. | 141/361 |
| 7,032,818 B2 * | 4/2006 | Thomas et al. | 235/381 |
| 7,084,769 B2 | 8/2006 | Bauer | |
| 7,151,455 B2 | 12/2006 | Lindsay et al. | |
| 7,197,377 B2 | 3/2007 | Knepler et al. | |
| 7,320,432 B2 | 1/2008 | Sureaud et al. | |
| 7,357,299 B2 | 4/2008 | Frerking | |
| 7,423,531 B2 | 9/2008 | Bui et al. | |
| 7,436,301 B2 | 10/2008 | Norman et al. | |
| 7,577,498 B2 * | 8/2009 | Jennings et al. | 700/245 |
| 7,617,850 B1 * | 11/2009 | Dorney | 141/94 |
| 7,845,375 B2 * | 12/2010 | Dorney | 141/94 |
| 8,056,468 B2 * | 11/2011 | De'Longhi | 99/285 |
| 8,127,805 B2 * | 3/2012 | Dorney | 141/104 |
| 8,176,948 B2 * | 5/2012 | Carrig | 141/21 |
| 8,245,739 B1 * | 8/2012 | Wade et al. | 141/94 |
| 2001/0050116 A1 | 12/2001 | Skell et al. | |
| 2002/0044096 A1 | 4/2002 | Chung | |
| 2003/0174099 A1 | 9/2003 | Bauer et al. | |
| 2004/0140013 A1 | 7/2004 | Yacko et al. | |
| 2005/0015348 A1 | 1/2005 | Knepler | |
| 2005/0029287 A1 * | 2/2005 | Mobbs | 222/1 |
| 2005/0087255 A1 * | 4/2005 | Humphrey et al. | 141/94 |
| 2005/0099304 A1 * | 5/2005 | Humphrey | 340/572.8 |
| 2005/0242950 A1 | 11/2005 | Lindsay et al. | |
| 2006/0076401 A1 | 4/2006 | Frerking | |
| 2006/0145862 A1 | 7/2006 | Norman et al. | |
| 2006/0187039 A1 | 8/2006 | Bui et al. | |
| 2006/0255131 A1 | 11/2006 | Stewart | |
| 2007/0006942 A1 | 1/2007 | Pluvinage | |
| 2007/0017988 A1 | 1/2007 | Sureaud et al. | |
| 2007/0116600 A1 | 5/2007 | Kochar et al. | |
| 2007/0176772 A1 | 8/2007 | Nemoto et al. | |
| 2007/0205221 A1 | 9/2007 | Carpenter et al. | |
| 2007/0210923 A1 | 9/2007 | Butler et al. | |
| 2008/0029541 A1 | 2/2008 | Wallace et al. | |
| 2008/0189078 A1 | 8/2008 | Vok et al. | |
| 2008/0191884 A1 | 8/2008 | Garcia et al. | |
| 2008/0195251 A1 | 8/2008 | Milner | |
| 2008/0271809 A1 | 11/2008 | Goldman et al. | |

OTHER PUBLICATIONS

Canadian Office Action from Canadian Patent Application No. 2,737,935; dated Jan. 8, 2013.

Mexican Office Action from Mexican Patent Application No. MX/a/2011/003456, dated Mar. 21, 2013.

* cited by examiner

PRIOR ART

BEVERAGE DISPENSE VALVE CONTROLLED BY WIRELESS TECHNOLOGY

RELATED APPLICATION

The present application claims the benefit of U.S. Provisional Patent Application No. 61/151,770, filed on Feb. 11, 2009, which application is incorporated by reference herein and made a part hereof.

FIELD OF THE INVENTION

The invention relates generally to dispensing fluids. More specifically, the invention provides methods and systems for dispensing fluids, such as beverages, using wireless technology.

BACKGROUND OF THE INVENTION

The present invention relates to dispensing fluids, such as beverages, using wireless technology. Retail establishments, for example fast food restaurants and convenience stores, often utilize fountain drink dispensers to dispense servings of different beverages to multiple users. Using such beverage dispensers allows consumers to purchase a cup or other containers that may be filled with one or more beverages at the beverage dispenser. Unfortunately, however, traditional systems cannot adequately monitor the user's actions to confirm the user obtained the beverage paid for. Indeed, some "premium" beverages may be offered at the beverage dispenser, however, there is no efficient method or system to efficiently monitor whether consumers pay for the drink they consume.

SUMMARY OF THE INVENTION

The following presents a simplified summary of the disclosure in order to provide a basic understanding of some aspects of the invention by way of exemplary embodiments. These embodiments do not define key or critical elements of the invention or to delineate the scope of the invention. The following summary merely presents some of the concepts of the disclosure in a simplified form as a prelude to the more detailed description of aspects of the invention provided below.

Aspects of the invention relate to a beverage dispensing system, having at least one beverage container and at least one beverage dispenser. The beverage container may include a sidewall disposed around a central bottom, wherein the bottom is distal to an opening for receiving a beverage, and a container wireless transceiver associated with the container. In one embodiment, the container wireless transceiver may be affixed to the bottom of the container. In other embodiments, the container wireless transceiver may be affixed to the sidewall of the container. Yet in other embodiments, the container wireless transceiver may be located in an impermeable layer between the sidewall and the bottom of the container, wherein the impermeable layer is not in fluid communication with the location where the beverage would be received in the opening. Additionally, the container wireless transceiver may be configured to transmit an electronic signal indicative that the beverage container is validated to receive a beverage and whether the beverage container is properly located to receive the beverage from the valve of the drink dispenser.

In aspects in accordance with this invention, the beverage dispenser may include a housing, a valve extending from the housing configured to dispense the beverage into the container located below the valve, and a dispenser wireless transceiver located in close proximity to the beverage dispenser configured to communicate with the container wireless transceiver on the beverage container. The beverage dispenser may further include a valve lever that extends from the housing, wherein in some embodiments the dispenser wireless transceiver may be located on the valve lever. In other embodiments, the valve lever may include a lever backing that extends from the housing, wherein the dispenser wireless transceiver is located on the lever backing. The dispenser wireless transceiver may be configured to receive a return signal from a compatible container indicative that the beverage container is validated to receive the beverage from the beverage dispenser and whether the beverage container is properly located to receive the beverage. Additionally, when the dispenser wireless transceiver is positioned such that upon placement of a compatible container in a location to properly receive the beverage from the valve, the dispenser wireless transceiver may be aligned with the container wireless transceiver of the beverage container. In yet another embodiment, when the beverage container is placed under the valve, the dispenser wireless transceiver may transmit a first electronic signal to the beverage container and the container wireless transceiver may transmit a second electronic signal to the dispenser wireless transceiver to confirm proper placement under the valve and to confirm that the beverage container is a compatible container to receive the beverage from the valve, and wherein the valve subsequently dispenses the beverage into the beverage container.

Further aspects of the invention are related to a beverage container configured to communicate with a beverage dispenser that includes a dispenser wireless transceiver. The beverage container may include a sidewall disposed around a central bottom, wherein the bottom is distal to an opening for receiving a beverage and a container wireless transceiver affixed to the container, with the container wireless transceiver configured to communicate with the dispenser wireless transceiver. In one embodiment, the container wireless transceiver may be affixed to the bottom of the container. In other embodiments, the container wireless transceiver may be affixed to the sidewall of the container. Yet in other embodiments, the container wireless transceiver may be located in an impermeable layer between the sidewall and the bottom of the container, wherein the impermeable layer is not in fluid communication with the location where the beverage would be received in the opening. Additionally, the container wireless transceiver may be configured to transmit an electronic signal indicative that the beverage container is validated to receive a beverage and whether the beverage container is properly located to receive the beverage from the valve of the drink dispenser.

Further aspects of the invention are related to a beverage dispenser configured to communicate with a beverage container that includes a wireless transceiver. The beverage dispenser may include a housing, a valve extending from the housing configured to dispense the beverage into the container located below the valve, and a dispenser wireless transceiver located in close proximity to the beverage dispenser configured to communicate with the container wireless transceiver on the beverage container. The beverage dispenser may further include a valve lever that extends from the housing, wherein in some embodiments the dispenser wireless transceiver may be located on the valve lever. In other embodiments, the valve lever may include a lever backing that extends from the housing, wherein the dispenser wireless transceiver is located on the lever backing. The dispenser wireless transceiver may be configured to receive a return signal from a compatible container indicative that the beverage container is validated to receive the beverage from the beverage dispenser and whether the beverage container is properly located to receive the beverage. Additionally, when the dispenser wireless transceiver is positioned such that upon placement of a compatible container in a location to properly receive the beverage from the valve, the dispenser wireless transceiver may be aligned with the container wireless transceiver of the beverage container. In yet another embodiment, when the beverage container is placed under the valve, the dispenser wireless transceiver may transmit a first electronic signal to the beverage container and the container wireless transceiver may transmit a second electronic signal to the dispenser wireless transceiver to confirm proper placement under the valve and to confirm that the beverage container is a compatible container to receive the beverage from the valve, and wherein the valve subsequently dispenses the beverage into the beverage container.

Further aspects of the invention are related to a method for dispensing fluids for example with the container and beverage dispenser or beverage dispensing system as described above. The method may include the steps of: 1) sensing a beverage container in close proximity to a beverage dispenser; 2) transmitting a first electronic signal to the beverage container from a dispenser wireless transceiver located in close proximity to the beverage dispenser; 3) transmitting a second electronic signal to the dispenser wireless transceiver from a container wireless transceiver associated with the container; and 4) dispensing the fluid from the beverage dispenser to the beverage container. Additionally, the transmission of the first electronic signal and the second electronic signal may confirm the proper placement of the beverage container under the beverage dispenser and may confirm that the beverage container is a compatible container to receive a fluid from the beverage dispenser.

These and other features and advantages of the present invention will become apparent from the description of the preferred embodiments, with reference to the accompanying drawing figures.

BRIEF DESCRIPTION OF THE DRAWINGS

The present disclosure is illustrated by way of example and not limited in the accompanying figures in which like reference numerals indicate similar elements and in which.

The reader is advised that the attached drawings are not necessarily drawn to scale.

DETAILED DESCRIPTION OF THE INVENTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

Figure 1:
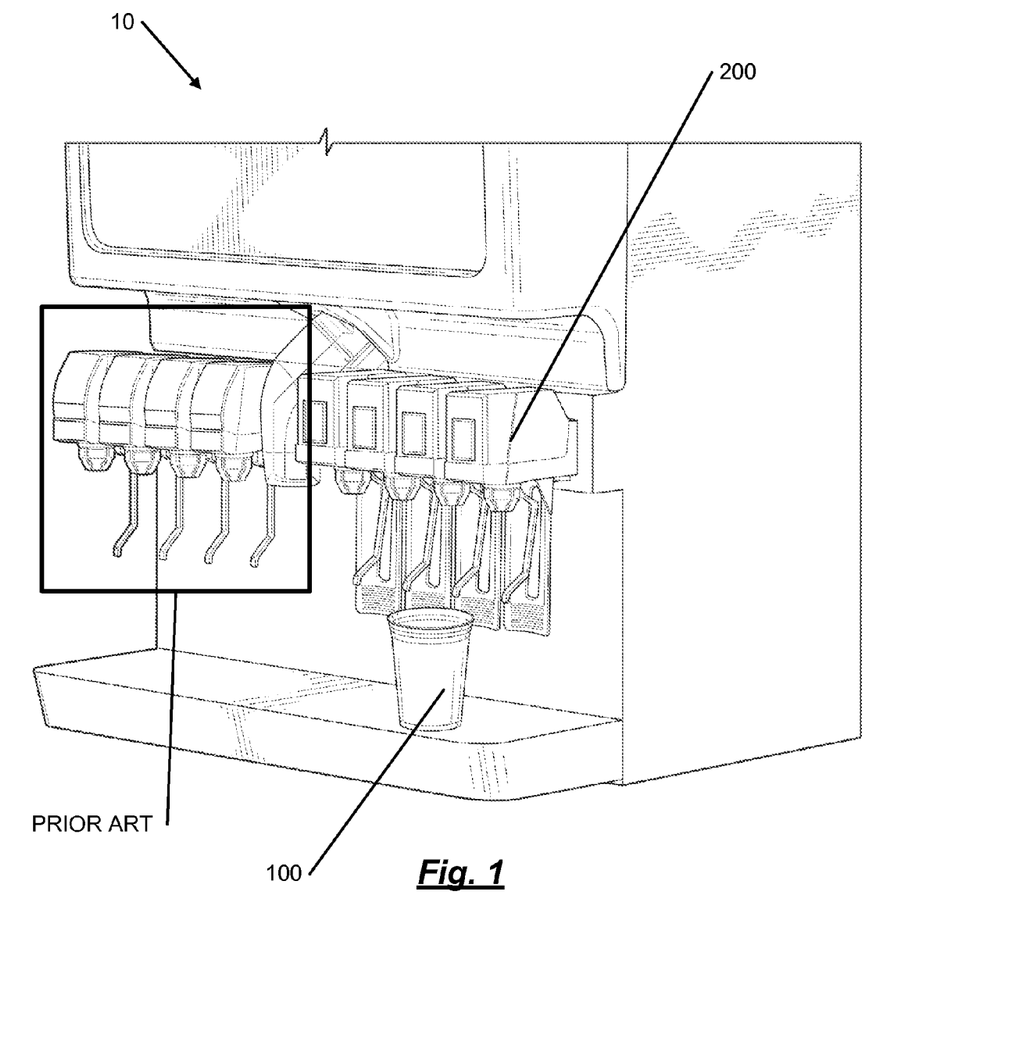
FIG. 1 illustrates a perspective view of an exemplary beverage dispensing system in accordance with aspects of the invention.

An exemplary beverage dispensing system may comprise one or more components shown in FIGS. 1 through 3C. As illustrated in FIGS. 1 through 3C, the beverage dispensing system 10 may comprise a container 100 and a beverage dispenser 200. As is shown in FIG. 1, the beverage dispensing system may include one or more beverage dispensers 200. Additionally, as shown in FIG. 1, the beverage dispensing system may include beverage dispensers in accordance with the present invention and traditional beverage dispensers utilized in the prior art, represented by the box labeled "PRIOR ART" in FIG. 1.

Figure 2:
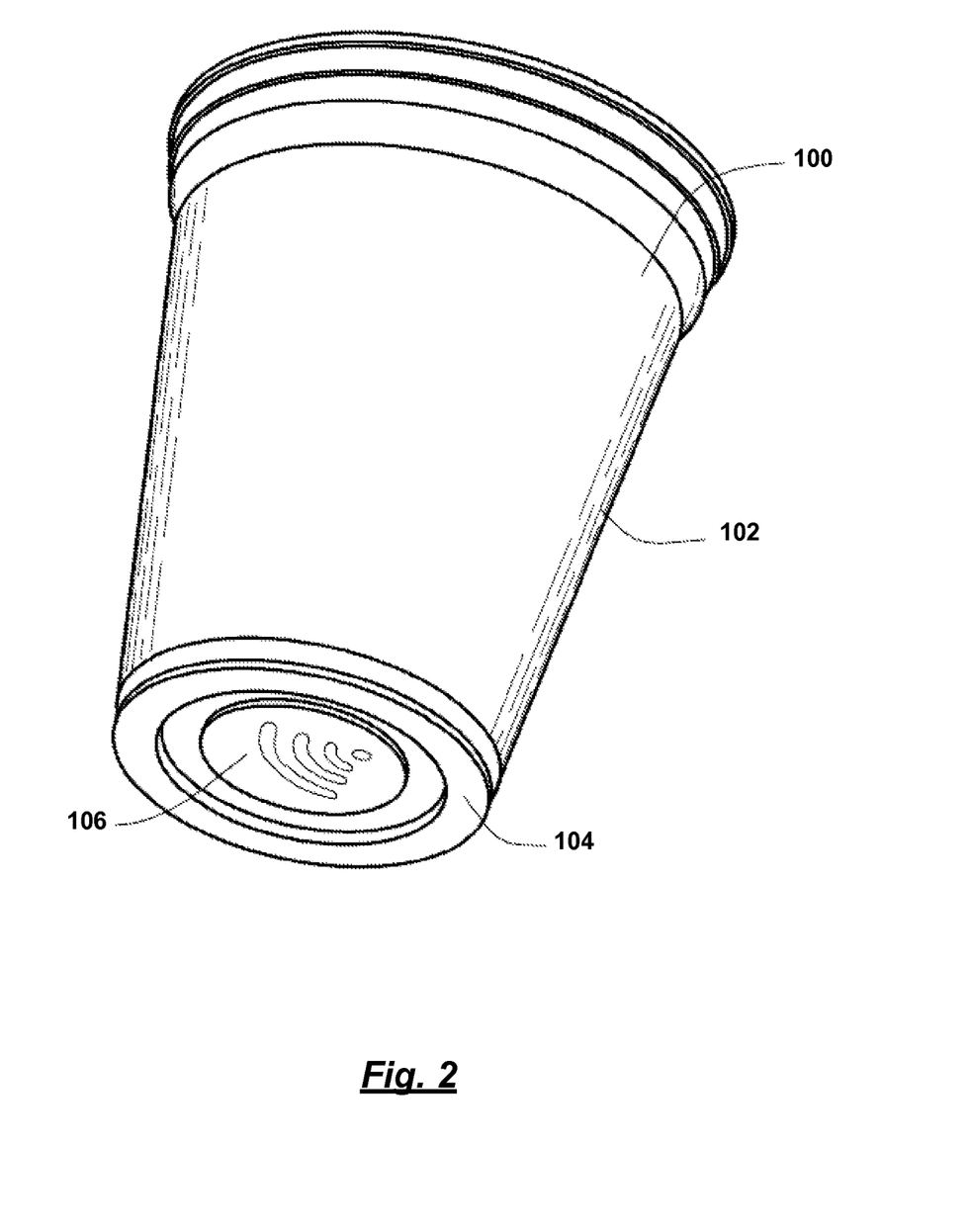
FIG. 2 illustrates a perspective view of an exemplary beverage container that may be used with the beverage dispensing system from FIG. 1 in accordance with aspects of the invention.

As illustrated in FIG. 2, aspects of the invention relate to novel beverage containers that can be utilized with a beverage dispenser 200 in accordance with this invention, such as container 100. Exemplary container 100 may contain a sidewall 102 disposed around a central bottom 104, wherein the bottom 104 is distal to an opening (not shown) for receiving a beverage. While the exemplary container 100 is shown as an open-faced cup, those skilled in the art will readily appreciate that other containers that are configured to hold a beverage, such as a bottle, can, bowl, or any structure that may receive a fluid, may be utilized in accordance with one or more embodiments of the invention.

Additionally, the container 100 may be made of any materials known and used in the art. The container 100 may be made the materials, such as: plastic, Styrofoam™, paper, or metal in accordance with aspects of this invention. Additionally, the container 100 may be any size as known and used in the art without departing from this invention.

In accordance with one embodiment, the container 100 comprises a wireless transceiver 106. The wireless transceiver 106 may be configured to utilize one or more forms of wireless technology, including but not limited to: radio frequency identification (RFID), electronic article surveillance (EAS), Bluetooth, cellular, and/or any transmissions in accordance with IEEE 802.xx. Indeed, any component(s) configured to transmit and/or receive wireless signals is within the scope of this disclosure. In accordance with aspects of this invention, the wireless transceiver 106 may be in the form of RFID, similar to examples such as automated automobile toll collection or security access cards. Additionally, the wireless transceiver 106 may be in the form of an EAS system. EAS systems are generally used in a retail setting for security and to help protect against shoplifting.

RFID systems generally may include one or more RFID tags that may be inductively-coupled, capacitively-coupled, active, semi-passive, and passive. In general, each RFID tag works by first, storing data within an RFID tag's microchip. The RFID tag may include an antenna that receives electromagnetic energy from an RFID reader's antenna. Using power from the RFID tag's internal battery or power harvested from the reader's electromagnetic field, the tag may then send radio waves back to the reader. The reader may then receive the RFID tag's radio waves and interpret the frequencies as meaningful data.

EAS systems may include technologies such as radio frequency (RF) systems, electromagnetic systems, acousto-magnetic systems, or microwave systems. RF systems generally work with an RF tag or label attached to a product, with the RF tag being basically a miniature, disposable electronic circuit and antenna. The RF tag or label may respond to a specific frequency emitted by a transmitter antenna. For electromagnetic systems, a magnetic, iron-containing strip may be attached to the product. This electromagnetic strip can be activated or deactivated using a highly intense magnetic field. The electromagnetic strip may respond to electromagnetic field transmitted from a transmitter antenna. For acousto-magnetic systems, a transmitter sends a radio-frequency signal in pulses, which in turn may energize a tag within the transmitted zone. When the pulse ends, the tag responds, emitting a single frequency signal like a tuning fork. While the transmitter is off between pulses, the tag signal is detected by the receiver and is checked to ensure it is the correct frequency. If all these criteria are met, the tag is signaled as correct (or alarmed in the example of a security system).

These wireless systems are different systems known and used in the art at the present time, however, any component(s) configured to transmit and/or receive wireless signals is within the scope of this invention.

As shown in FIG. 2, wireless transceiver 106 may be affixed or molded to the bottom 104 of the beverage container 100. In other embodiments, however, the wireless transceiver 106 may be located on, affixed to, or otherwise associated with a sidewall 102 of the container 100. Yet in further embodiments, the wireless transceiver 106 may be located within a secondary compartment of container 100. For example, an impermeable layer or structure may be placed between the sidewall 102 and/or the bottom 104 of the container 100 to create an internal compartment that is not in fluid communication with the location where a beverage would be received in the opening (not shown). As discussed in more detail below, the wireless transceiver 106 may be configured to transmit information to a beverage dispenser, such as a dispenser 200 shown in FIGS. 3A through 3C.

Figure 3A:
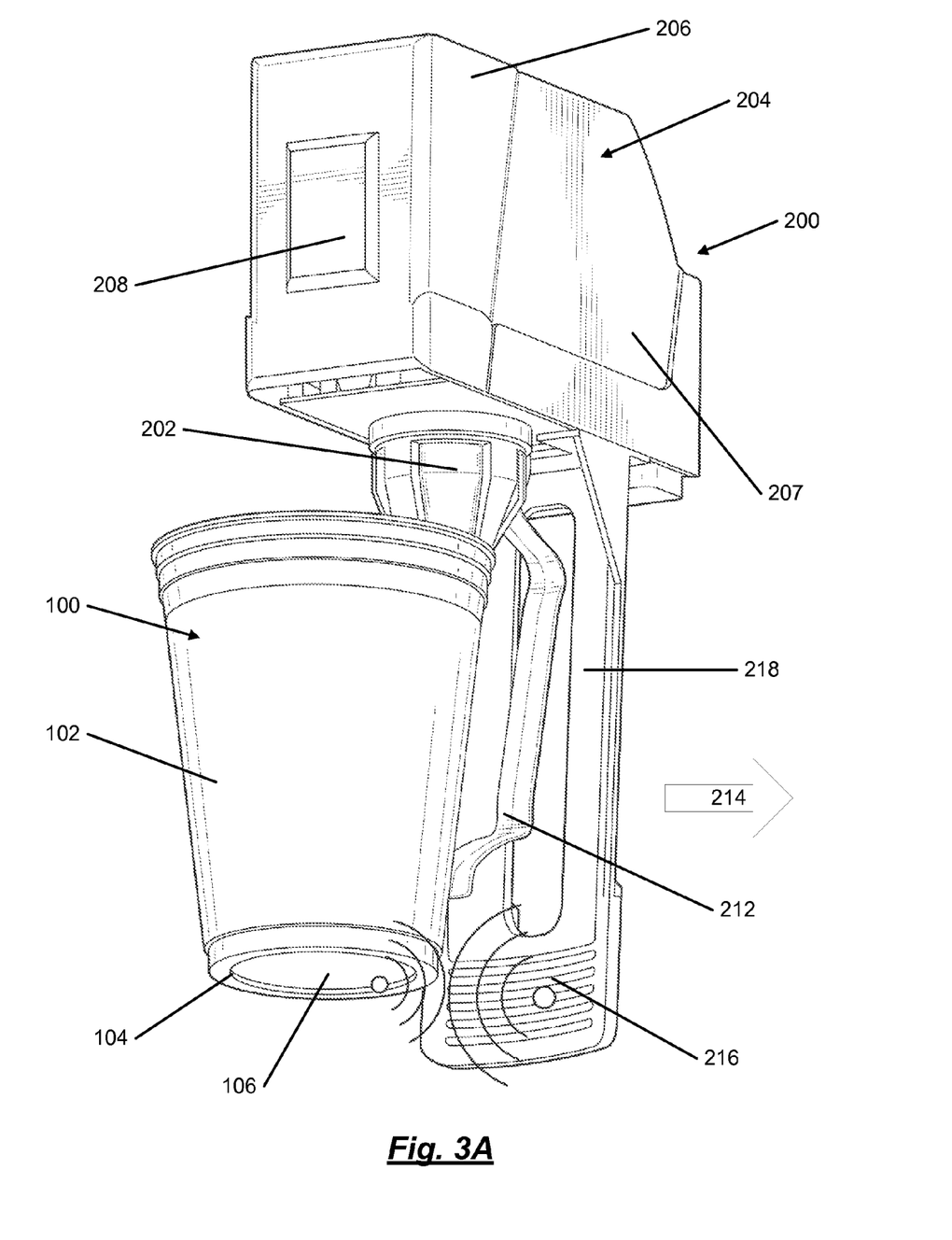
FIG. 3A illustrates a front perspective view of an exemplary beverage dispenser that may be used with the beverage dispensing system from FIG. 1 in accordance with aspects of the invention.
Figure 3B:
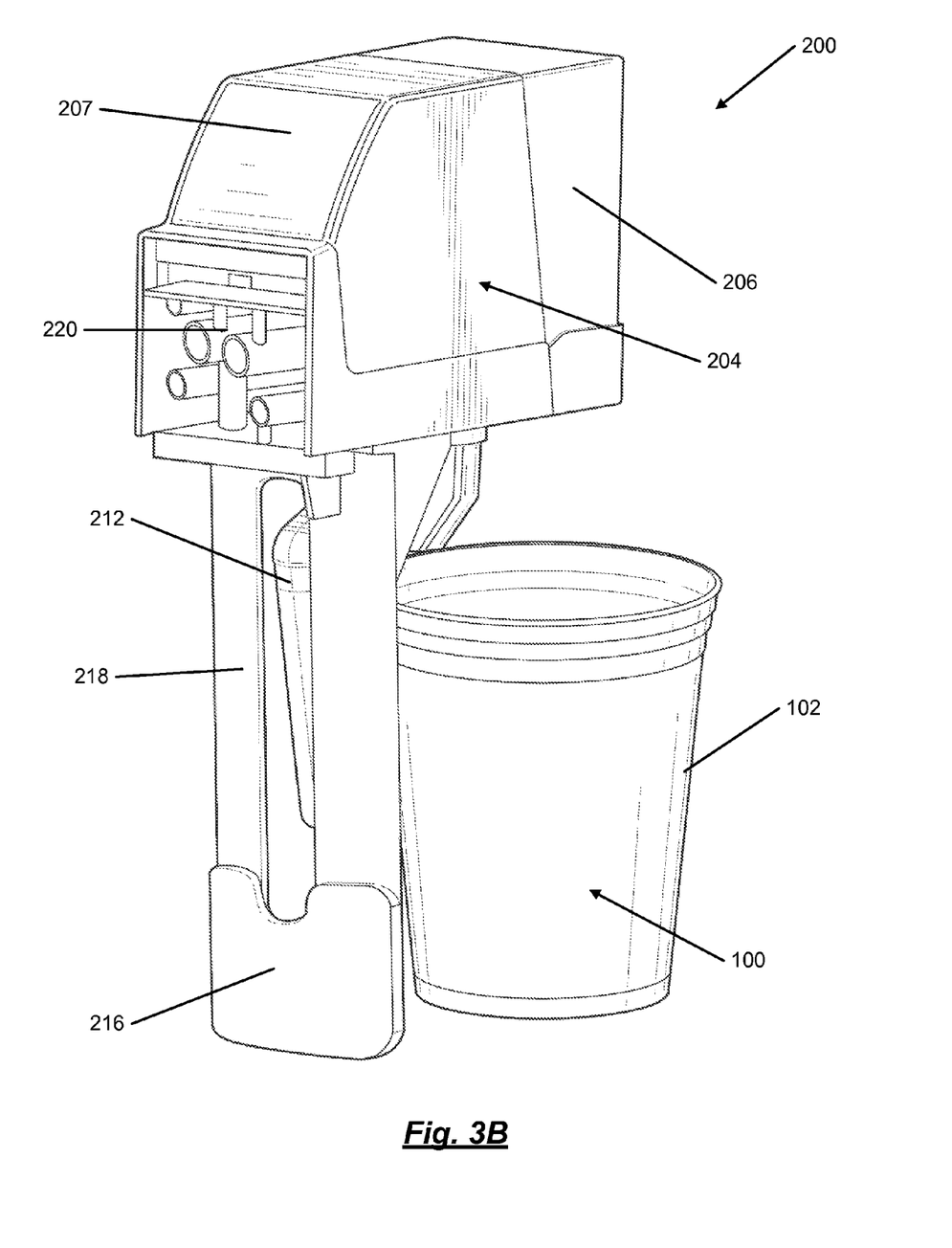
FIGS. 3B and 3C illustrate rear perspective views of the beverage dispenser from FIG. 3A in accordance with aspects of the invention.
Figure 3C:
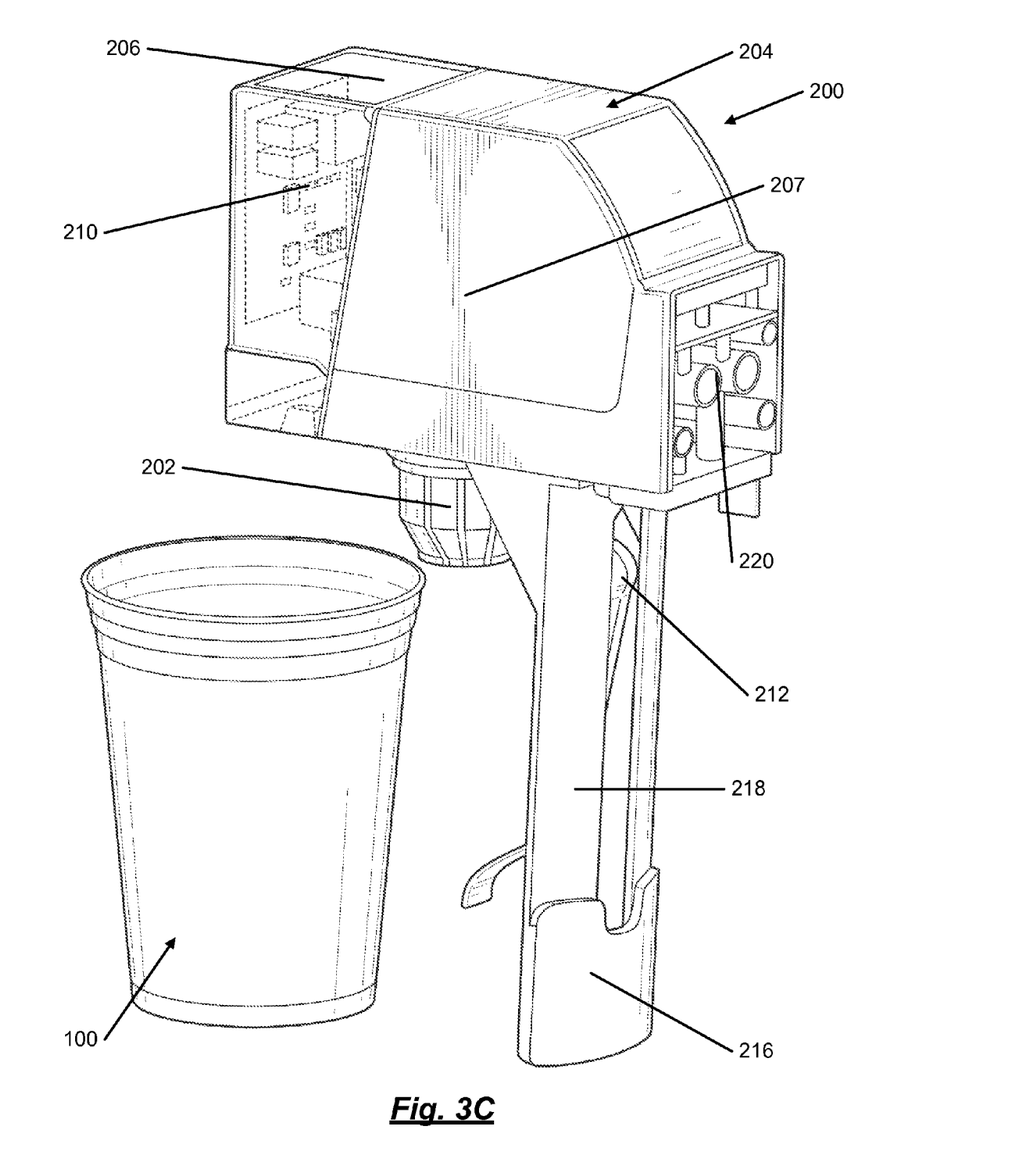

An exemplary beverage dispenser 200 is shown in FIGS. 3A through 3C. The term "beverage" has been used to readily convey exemplary embodiments to reader, however, those skilled in the art will readily appreciate that any liquid, gel, or similar product, including for example, concentrated syrup, is within the scope of the invention. Therefore, while the below embodiments are explained in relation to a ready-made beverage, readers are advised that the dispensing of any liquid, gel, or similar product is within the scope of the invention. The exemplary beverage dispenser 200 may generally resemble a traditional fountain-drink dispenser and may comprise a valve 202, a housing 204, and a valve lever 212.

As illustrated in FIGS. 3A through 3C, the housing 204 may include a front housing area 206 and a rear housing area 207. The front housing area 206 may include a push-button 208. The push-button 208 may include a logo of the beverage to be dispensed from the beverage dispenser 200. Additionally, the push-button 208 may illuminate at different times, such as when the push-button 208 is pushed, when the beverage dispenser 200 is ready, or when the beverage dispenser 200 is communicating with a container 100. Additionally, the push-button 208 may illuminate and blink at varying times or varying frequencies to signal events or activities. In accordance with aspects of this invention, the push-button 208 may only be a button, that may not be pushed at all. Pressing the push-button 208 may control the flow of the beverage from the valve 202 to the container 100. Additionally, in accordance with other aspects of this invention, the housing 204 may include a lever actuator that may actuate the valve 202 and dispense the beverage from the valve 202 to the container 100.

In addition to the push-button 208, the front housing 206 may also include electronics 210. The electronics 210 may be self-contained within the front housing 206 as is illustrated specifically in FIG. 3C. The electronics 210 may be in the form of a circuit board or other similar control electronics capable of controlling the functionality and operability of the beverage dispenser 200. The electronics 210 may also help facilitate communication between the container 100 and the beverage dispenser 200.

The rear housing 207 may include a set of connections 220 to the beverage dispensing system 10. As illustrated in FIGS. 3B and 3C, these connections 220 may include tubing or similar-type connection ends configured to attach to the tubing or connection of the beverage dispensing system 10. The connections 220 may also be capable of connecting directly to individual beverage lines, such as when the beverage dispenser 200 is not used as part of a beverage dispensing system 10.

As illustrated in FIGS. 3A through 3C, the beverage dispenser may also include a valve 202. The valve 202 may protrude or extend from the housing 204 as is shown in FIG. 3A. While the term "valve" is used throughout this disclosure, those skilled in the art will readily appreciate that any outlet configured to dispense a liquid is within the scope of invention. The valve 202 may be configured to dispense a beverage into a compatible container 100. Additionally, the valve 202 may include a relay or electromechanical switch that turns the valve on or off (or enabled or disabled) based on the presence of a compatible container 100.

Additionally, as illustrated in FIGS. 3A through 3C, the beverage dispenser may include a valve lever 212. The valve lever 212 may protrude or extend from the housing 204 as shown in FIG. 3A. The valve lever 212 may be of any of various shapes and sizes without departing from this invention. As discussed in more detail below, the use of the valve lever 212 may be further supplanted or replaced with a wireless transceiver, such as a wireless transceiver 216 located on the beverage dispenser 200. The valve lever 212 may also include a lever backing 218. The lever backing 218 may extend from the housing 204, and more specifically, from the rear housing 207. The lever backing 218 may include the wireless transceiver 216 as illustrated in FIG. 3A. For example, the wireless transceiver 216 may be located on the lower portion of the lever backing 218. Additionally, the beverage dispenser 200 may not include the lever backing 218, and in this instance, the transceiver 216 may be located on the valve lever 212. In another embodiment in accordance with this invention, the beverage dispenser 200 does not include a valve lever 212 and only includes the lever backing 218, wherein the transceiver 216 may be located on the lever backing 218.

As illustrated in FIGS. 3A through 3C, the beverage dispenser 200 and more specifically, the valve 202, may dispense a beverage into a compatible container, such as the container 100 as illustrated in FIG. 2. Construction of exemplary containers has been described above in relation to FIG. 2, and is also known in the art. As discussed below, however, in certain embodiments the presence and/or orientation of a wireless transceiver 106 within, affixed to, imbedded or otherwise associated with container 100 may be determinative of whether a beverage receptacle may be considered a compatible container 100.

In certain embodiments, valve 202 may be in operative communication with a valve lever 212 which may be mechanical, electrical, or electro-mechanical. In one embodiment having valve lever 212, pressure may be placed upon the valve lever 212 (for example, along the direction of arrow 214), as container 100 is placed under the valve 202. Pressure upon the valve lever 212 may transmit a signal (electrical or mechanical) indicating the presence of a container, such as container 100. In one embodiment where transceiver 216 is located on the lower portion of the lever backing 218, a container 100 configured for use with dispenser 200 may include the wireless transceiver 106 located on or near its bottom 104, such that the wireless transceiver 216 of the beverage dispenser 200 is aligned with wireless transceiver 106 of the container 100.

In one embodiment, the wireless transceiver 216 of the dispenser 200 is configured to transmit an electronic signal. The transmission of the electronic signal may be set to a continuous loop, such that the signal is continually transmitted. Yet in other embodiments, the transmission of the electronic signal may be dependant on one or more conditions, such as determined or influenced by a timer, a motion sensor (which may external to the dispenser 200) or any other hardware or software in communication with dispenser 200. As discussed above in relation to the embodiment shown in FIG. 3A, the wireless transceiver 216 may be located in the lever backing 218 of the valve lever 212, such that a consumer may press the container 100 against it to dispense the beverage from valve 202. In one embodiment, the electronic signal transmitted from wireless transceiver 216 is received by wireless transceiver 106 on container 100 when container 100 is correctly placed to receive a beverage from the valve 202. In this regard, one or both of the wireless transceivers 106, 216 are configured to transmit a signal that may only be received by the other when each are within a threshold distance from each other. Yet in other embodiments, the signal transmitted from one of the transceivers 106, 216 may be received by the other transceiver 106, 216 at a distance that is further than when the container 100 is properly placed to receive a beverage from the valve 202, however, the dispenser 200 is configured such that a threshold signal strength or proximity measurement is required for the valve 202 to dispense the beverage, wherein the threshold strength or proximity measurement is met only when the container 204 is properly located to receive a beverage from valve 202.

In one embodiment, upon receiving the electronic signal from the wireless transceiver 216, the wireless transceiver 106 of the container 100 may transmits a return signal indicating that the container is located in a proper configuration to receive the beverage, such as the placement of the container 100 in relation to valve 202 shown in FIG. 3A. In this regard, the beverage is only dispensed when the container 100 having a wireless transceiver 106 transmitting a valid electronic return signal is correctly placed to receive the beverage.

In one embodiment, the wireless transceiver 106 is configured to transmit information to enable a beverage to be dispensed from a specific valve 202. Yet in other embodiments, the wireless transceiver 106 is configured to enable the dispensing of a beverage from several different valves. In one such embodiment, at least one valve dispenses a fluid that is different than the fluid dispensed from at least one other valve. In another embodiment, the wireless transceivers 106, 216 do not require complex circuitry that requires information to be rewritten with additional information, such as the amount of beverage dispensed, quantity of times the container has been utilized at one or more dispensers 200, or other information. Yet in other embodiments, information, including one or more of the parameters above (and/or other parameters) may be transmitted. Furthermore, in certain embodiments, one or more of the electronic signals transmitted from the wireless transceiver(s) 106, 216 does not include information regarding the purchaser or user of container 100. Yet in other embodiments, such information regarding the purchaser or user of container 100 may be utilized.

In one embodiment, one or more of the electronic signals to be transmitted from container 100 to the transceiver 216 is determined and configured before a consumer purchases the cup. Therefore, in certain embodiments, this would reduce the complexity and time required for transactions related to selling or otherwise providing container 100 to a consumer.

As those skilled in the art will readily appreciate in view of this disclosure, either wireless transceiver 106, 216 may be located at other locations associated with the beverage dispenser 200 and the container 100.

The advantages and benefits of a beverage dispensing system in accordance with this invention may be readily apparent to those of skill in the art. Specifically, one advantage of the beverage dispensing system 10 may be controlled access to premium beverages at a beverage dispensing system. Because of the transmissions between the transceiver 106 on the container 100 and the transceiver 216 on the beverage dispenser 200, the beverage dispenser system 10 may provide controlled access to premium beverages. Another advantage for the beverage dispensing system 10 may be that the RFID/EAS equipped valves and wireless systems are generally more difficult to bypass than systems that utilize mechanical or contact/switch systems as used in the prior art. Additionally, the beverage dispensing system 10 does not require physical contact between the container 100 and the valve 202 to activate the beverage dispenser system 10, thereby making the beverage dispensing system 10 of the present invention easier to use and generally more sanitary.

Conclusion

The present invention is disclosed above and in the accompanying drawings with reference to a variety of examples. The purpose served by the disclosure, however, is to provide an example of the various features and concepts related to the invention, not to limit the scope of the invention. One skilled in the relevant art will recognize that numerous variations and modifications may be made to the aspects described above without departing from the scope of the present invention, as defined by the appended claims.

We claim:

1. A beverage dispensing system comprising:
   at least one beverage container, the beverage container comprising:
      a sidewall disposed around a central bottom, wherein the bottom is distal to an opening for receiving a beverage, and
      a container wireless transceiver associated with the container; and
   at least one beverage dispenser, the beverage dispenser comprising:
      a housing that includes a push-button;
      a valve extending from the housing configured to dispense liquid into the container located below the valve, wherein pushing the push-button controls a flow of the beverage from the valve to the container;

a dispenser wireless transceiver located in close proximity to the beverage dispenser configured to communicate with the container wireless transceiver on the beverage container, wherein one of the container wireless transceiver or the dispenser wireless transceiver transmits an electronic signal that is received by the other of the container wireless transceiver or the dispenser wireless transceiver and the electronic signal meets a threshold signal strength that is required for the valve to dispense the beverage, and further wherein the threshold signal strength is met only when the container is properly located to receive the beverage from the valve, and further wherein the push-button illuminates when the beverage dispenser is communicating with the beverage container.

2. The beverage dispensing system according to claim 1, wherein the container wireless transceiver is affixed to the bottom of the container.

3. The beverage dispensing system according to claim 1, wherein the container wireless transceiver is affixed to the sidewall of the container.

4. The beverage dispensing system according to claim 1, wherein the container wireless transceiver is located in an impermeable layer between the sidewall and the bottom of the container, wherein the impermeable layer is not in fluid communication with the location where the beverage would be received in the opening.

5. The beverage dispensing system according to claim 1, wherein the container wireless transceiver is configured to transmit a second electronic signal indicative that the beverage container is validated to receive a beverage.

6. The beverage dispensing system according to claim 1, wherein the housing includes a lever actuator.

7. The beverage dispensing system according to claim 6, wherein the push-button illuminates when one or more of the events occur: when the beverage dispenser is ready, when the lever actuator is actuated, and when the push-button is pushed.

8. The beverage dispensing system according to claim 1, wherein the housing includes self-contained electronics, wherein the self-contained electronics control the functionality of the beverage dispenser.

9. The beverage dispensing system according to claim 1, wherein the valve includes a relay or electromechanical switch that turns the valve on or off based on the communication between the container wireless transceiver and the dispenser wireless transceiver.

10. The beverage dispensing system according to claim 1, wherein the beverage dispenser further includes a valve lever that extends from the housing.

11. The beverage dispensing system according to claim 9, wherein the dispenser wireless transceiver is located on the valve lever.

12. The beverage dispensing system according to claim 9, wherein the valve lever includes a lever backing that extends from the housing, wherein the dispenser wireless transceiver is located on the lever backing.

13. The beverage dispensing system according to claim 1, wherein the dispenser wireless transceiver is configured to receive a return signal from a compatible container indicative that the beverage container is validated to receive the beverage from the beverage dispenser and whether the beverage container is properly located to receive the beverage.

14. The beverage dispensing system according to claim 1, wherein the dispenser wireless transceiver is positioned such that upon placement of a compatible container in a location to properly receive the beverage from the valve, the dispenser wireless transceiver is aligned with the container wireless transceiver of the beverage container.

15. The beverage dispensing system according to claim 1, wherein when the beverage container is placed under the valve, the dispenser wireless transceiver transmits a first electronic signal to the beverage container and the container wireless transceiver transmits a second electronic signal to the dispenser wireless transceiver to confirm proper placement under the valve and to confirm that the beverage container is a compatible container to receive the beverage from the valve, and wherein, upon a push button or lever actuation, the valve subsequently dispenses the beverage into the beverage container.

16. The beverage dispensing system according to claim 1, wherein the dispenser wireless transceiver transmits an electronic signal that is continually transmitted.

17. The beverage dispensing system according to claim 1, wherein the dispenser wireless transceiver and the container wireless transceiver transfer information that can be rewritten.

18. The beverage dispensing system according to claim 1, wherein the push-button includes a logo of the beverage to be dispensed from the beverage dispensing system.

19. The beverage dispensing system according to claim 1, wherein the push-button illuminates when the push-button is pushed.

20. A beverage dispenser configured to communicate with a container that includes a wireless transceiver, the beverage dispenser comprising:

a housing that includes a push-button;

a valve extending from the housing configured to dispense liquid into a container located below the valve, wherein pushing the push-button controls a flow of the beverage from the valve to the container; and a wireless transceiver located in close proximity to the beverage dispenser configured to communicate with the wireless transceiver on the container, wherein the wireless transceiver located in close proximity to the beverage dispenser transmits an electronic signal that is received by the wireless transceiver on the container and the electronic signal meets a threshold signal strength that is required for the valve to dispense the beverage, and further wherein the threshold signal strength is met only when the container is properly located to receive the beverage from the valve, and further wherein the push-button illuminates when the beverage dispenser is communicating with the container.

21. The beverage dispenser according to claim 20, wherein the housing includes a lever actuator.

22. The beverage dispenser according to claim 21, wherein the push-button illuminates when one or more of the events occur: when the beverage dispenser is ready, when the lever actuator is actuated, and when the push-button is pushed.

23. The beverage dispenser according to claim 20, wherein the housing includes self-contained electronics, wherein the self-contained electronics control the functionality of the beverage dispenser.

24. The beverage dispenser according to claim 20, wherein the valve includes a relay or electromechanical switch that turns the valve on or off based on the communication between the container wireless transceiver and the dispenser wireless transceiver.

25. The beverage dispenser according to claim 20, wherein the beverage dispenser further includes a valve lever that extends from the housing.

26. The beverage dispenser according to claim 25, wherein the dispenser wireless transceiver is located on the valve lever.

27. The beverage dispenser according to claim 25, wherein the valve lever includes a lever backing that extends from the housing, wherein the dispenser wireless transceiver is located on the lever backing.

28. The beverage dispenser according to claim 20, wherein the dispenser wireless transceiver is configured to receive a return electronic signal from a compatible container indicative that the beverage container is validated to receive the beverage from the beverage dispenser.

29. The beverage dispenser according to claim 20, wherein the dispenser wireless transceiver is positioned such that upon placement of a compatible container in a location to properly receive the beverage from the, the dispenser wireless transceiver is aligned with the container wireless transceiver of the beverage container.

30. The beverage dispensing system according to claim 20, wherein the dispenser wireless transceiver transmits an electronic signal that is continually transmitted.

31. The beverage dispensing system according to claim 20, wherein the dispenser wireless transceiver transfers and receives information that can be rewritten onto the dispenser wireless transceiver.

32. A beverage dispensing system comprising:
  at least one beverage container, the beverage container comprising:
    a sidewall disposed around a central bottom, wherein the bottom is distal to an opening for receiving a beverage, and
    a container wireless transceiver associated with the container; and
  at least one beverage dispenser, the beverage dispenser comprising:
    a housing that includes a push-button, wherein the push-button illuminates when the push-button is pushed;
    a valve extending from the housing configured to dispense liquid into the beverage container located below the valve;
    a dispenser wireless transceiver located in close proximity to the beverage dispenser configured to communicate with the container wireless transceiver on the beverage container,
    wherein one of the container wireless transceiver or the dispenser wireless transceiver transmits an electronic signal that is received by the other of the container wireless transceiver or the dispenser wireless transceiver and the electronic signal meets a threshold signal strength that is required for the valve to dispense the beverage, and further wherein the threshold signal strength is met only when the container is properly located to receive the beverage from the valve, and further wherein the push-button illuminates when the beverage dispenser is communicating with the beverage container.

* * * * *